United States Patent Office 3,350,661
Patented Oct. 31, 1967

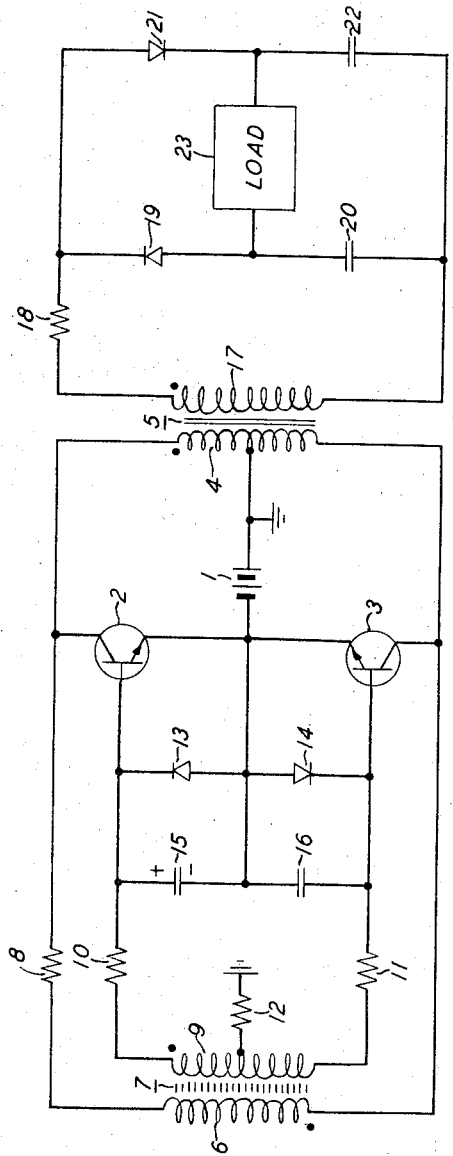

3,350,661
HIGH EFFICIENCY INVERTER WITH EXTENDED TRANSISTOR SATURATION INTERVALS
Stephen D. Bloom, Rockaway Township, Morris County, and Paul W. Ussery, Livingston, N.J., assignors to Bell Telephone Laboratories, Incorporated, New York, N.Y., a corporation of New York
Filed Dec. 28, 1965, Ser. No. 516,931
4 Claims. (Cl. 331—113)

ABSTRACT OF THE DISCLOSURE

An inverter circuit wherein individual capacitors are connected across the base and emitter electrodes of the inverter transistors to extend the saturated interval of the transistor and eliminate transient ringing and spiking effects.

---

This invention relates to high efficiency inverter circuits and more particularly to transistor inverter circuits that minimize switching transients.

In transistor inverter circuits, it is generally desired to switch the inverter transistors between saturation and cutoff to improve the efficiency of inversion. The saturated or cutoff state is preferred because the emitter-collector voltage of a transistor in saturation and the emitter-collector current of a transistor in cutoff are negligible values; hence there are only minimal power losses in the transistor in either of these states. A transistor in the active state between saturation and cutoff, however, acts as a variable resistor that consumes sufficient power to appreciably lower the efficiency of inversion. Since the transistor must pass through the power-wasting active state when being switched from saturation to cutoff and vice versa, transistors with high speed switching characteristics, i.e., transistors that switch rapidly between saturation and cutoff and hence spend only a relatively short time in the active state, appear to be ideally suited for highly efficient inversion.

Although these high speed switching characteristics are therefore generally desired from an efficiency standpoint, the rapid change of voltage and current caused by high speed switching through the active state has been found to introduce high output voltage transient switching spikes and ringing (spurious oscillation between the inverter transistors). Resistive bleeders in the output circuit are usually employed in these circuits to limit or dampen the magnitude of these high speed switching variations. The use of resistive bleeders in the output circuit, however, introduces power losses that more than overcome the efficiency advantages initially obtained by the high speed switching. If the switching speed through the active state is slowed to eliminate the switching spike and ringing effects, then the transistors consume power during the relatively slow transition through the power-wasting active region and, as initially discussed, thereby lower the efficiency of the circuit. The reduced efficiency resulting from the slower switching speed is, however, accepted by the art as the price of inversion without excessive switching transients.

It is, therefore, an object of this invention to provide an efficient inverter circuit which minimizes switching transients and preferably employ transistors with high speed switching capabilities.

The present invention employs a capacitor connected across the base and emitter electrodes of an inverter transistor to store energy during the interval that the feedback circuitry drives the transistor into saturation. Energy thus stored in the capacitor is discharged through the base-emitter path of the inverter transistor when the feedback circuitry ceases to apply the saturating drive to the transistor. The base-emitter drive supplied by the discharging energy stored in the capacitor extends the interval that the transistor spends in the minimal power loss saturated state and, to a limited extent, controls the rate with which the inverter passes through the active state. In a preferred embodiment of the invention, transistors with high speed switching characteristics would be employed to minimize the time that the inverter transistor spends in the active state once the extended saturation interval is finally terminated.

The extension of the time which the transistor spends in the saturated state after the saturation drive from the feedback circuit has been removed permits a significantly slower change of the voltages and currents in the circuit than would be obtained if, as in the prior art, a high speed transistor were switched immediately from saturation to cutoff when the saturating drive from the feedback circuit is removed. The slower change of the voltages and currents in the circuit due to the extended time during which the transistor is in saturation minimizes spiking and ringing effects. Since the transistor is operated either in saturation or cutoff and passes through the active state at a high speed, minimal power losses are incurred in this element and the efficiency of the circuit is thereby increased. As an added advantage, it has been found that the relatively limited degree of control exerted by the capacitor on the inverter transistor as it passes through the active state eliminates the transistor switching noise normally found in the output waveform of the inverter.

Other objects and features of the present invention will become apparent upon consideration of the following detailed description when taken in connection with the schematic embodiment of the invention illustrated in the accompaying drawing.

As can be seen from the drawing, a D.C. input source 1 is connected between the common emitter junction of inverter n-p-n transistors 2 and 3 and the center-tap terminal of primary winding 4 on linear transformer 5. The positive terminal of the input source 1 is connected to ground. The main power or inversion path is completed by connecting one end terminal of primary winding 4 to the collector electrode of transistor 2 and the other end terminal of winding 4 to the collector electrode of transistor 3. A feedback path is provided by serially connecting the primary winding 6 of saturable feedback transformer 7 with current limiting resistor 8 across the primary winding 4. The secondary winding 9 of transformer 7 is coupled on a saturable core to primary winding 6 and supplies base-emitter feedback current to transistor 2 by the serial connection of one end terminal of winding 9, current limiting resistor 10, the base-emitter path of transistor 2, diode 14, poled in the forward conductivity direction, current limiting resistor 11, and the other end terminal of winding 9. Base-emitter feedback current is supplied to transistor 3 by the serial connection from the other end terminal of winding 9, current limiting resistor 11, the base-emitter path of transistor 3, diode 13, poled in the forward conductivity direction, current limiting resistor 10, and the one terminal of winding 9. Diode 13 and capacitor 15 are each connected across the base and emitter electrodes of transistor 2 and diode 14 and capacitor 16 are each connected across the base and emitter electrodes of transistor 3. Starting resistor 12 is connected from the center-tap terminal of winding 9 to ground.

The output potential supplied by the inverter to the output circuit is induced in the secondary winding 17 of transformer 5. Winding 17 in turn is serially connected with a relatively small magnitude output damping resistor 18, diode 19, and filter capacitor 20. Diode 21 and filter capacitor 22 are serially connected across the serial combination of diode 19 and filter capacitor 20. The load 23 is connected from the junction of the diode 19 and capacitor 20 to the junction of diode 21 and capacitor 22. Diode 19 is poled in the forward conductivity direction from the load 23 to the resistor 18 and diode 21 is poled in the forward conductivity direction from the resistor 18 to the load 23.

When the D.C. input potential 1 is initially connected to the inventer circuit, current will flow from the positive or ground terminal of the input source 1 through starting resistor 12. The current leaving resistor 12 branches into two paths; the first of which comprises the upper portion of secondary winding 9, base current limiting resistor 10, the base-emitter path of transistor 2, and the negative terminal of the input source 1, while the second path comprises the lower portion of winding 9, base current limiting resistor 11, the base-emitter path of transistor 3, and the negative terminal of the input source 1. Although the inverter transistors are generally of the same conductivity type and have the same ratings, the current gain of one of the transistors will seldom be equal to the gain of the other transistor. The transistor of the higher current gain will be faster acting, that is, the current in its emitter-collector path will increase at a faster rate which, as discussed hereinafter, is all that is necessary to start the converter's push-pull mode of operation. In the present circuit, it is assumed for illustrative purposes that transistor 2 is faster acting and hence responds to the aforenoted starting current through resistor 12 and its base-emitter path so as to cause current to flow from the positive terminal of the source 1, through the upper portion of the winding 4, the collector-emitter path of transistor 2, and back on the negative terminal of the input source 1. Current will also flow from the positive or ground terminal of the input source 1, through the lower portion of winding 4, the primary winding 6 of saturable feedback transformer 7, current limiting resistor 8, the collector-emitter path of transistor 2, and back to the negative terminal of the source 1.

The current flow through primary winding 6 of saturable transformer 7 will, as can be seen from the dot convention indicated on the drawing, induce a potential in secondary winding 9 which causes a current to flow out of the dotted terminal of winding 9, through base current limiting resistor 10, the base-emitter path of transistor 2, forward biased diode 14, resistor 11, and into the other terminal of winding 9. This induced base-emitter current in transistor 2 increases the collector-emitter current flow of transistor 2, which then regeneratively increases the current through both the primary winding 6 of feedback transformer 7 and the base-emitter path of the transistor 2 and so on until the transistor is biased into deep saturation. It should be noted that diode 14 of the feedback network is forward-biased by the induced base-emitter current flow through transistor 2 and that the forward-voltage drop across this diode back-biases the other inverter transistor 3 to hold this transistor cutoff during the time that transistor 2 is saturated. At the same time, diode 14 limits the inverse voltage which appears across the base-emitter electrodes of the cutoff transistor 3 to the relatively small forward-voltage drop across the diode.

Before discussing the operation of the circuit in further detail, it is perhaps first useful to note that in a preferred embodiment the present invention will employ high switching speed transistors, i.e., transistors that inherently switch rapidly from saturation to cutoff and vice versa and therefore spend only a minimum time in the power-wasting active region. It should also be noted that a transistor in saturated state has, regardless of the degree of saturation, essentially negligible or minimal power losses.

In the foregoing discussion, the manner in which transistor 2 is biased into conduction and deep saturation was analyzed. Assuming, as before, that transistor 2 is saturated and that the potential induced in winding 9 is positive at the dot, it can be seen that capacitor 15 will be charged to the potential appearing across secondary winding 9 through the path comprising the resistor 10, the capacitor 15, the forward-biased diode 14, and the resistor 11. The polarity of the charge of the energy thus stored in capacitor 15 is indicated in the drawing. Secondary winding 9 of the feedback transformer 7 will continue to drive transistor 2 into deep saturation until the saturable core of feedback transformer 7 saturates. When the core of transformer 7 saturates, the flux in this transformer can no longer increase, no further potential of the polarity indicated will be induced in winding 9, and the base-emitter drive supplied by the feedback network to maintain the saturated state of the transistor 2 will terminate. Once the base-emitter drive from the feedback network to transistor 2 is terminated, the energy stored in capacitor 15 will begin to discharge and provide sufficient base-emitter current to keep transistor 2 in deep saturation. As the energy stored in capacitor 15 discharges through the base-emitter path of transistor 2, the degree of saturation of the transistor is slowly reduced. In this interval, the collector-emitter current in the transistor, which is proportional to the base-emitter current, decreases slowly. When the base-emitter drive supplied by capacitor 15 is no longer sufficient to maintain the saturated state of transistor 2, the transistor will begin its transition through the active state toward cutoff. In a preferred embodiment of the invention transistors with high switching speed characteristics, i.e., transistors that pass rapidly through the active state and hence introduce only minimal power losses during this transition, would be employed as inverter transistors to increase the efficiency of inversion. As discussed in detail hereinafter, however, capacitor 15 retains limited control over the rate with which transistor 2 passes through the active region and the switching speed is not, therefore, merely a function of the transistor characteristics.

In the interval that the feedback circuitry drives transistor 2 into saturation, output filter capacitors 20 and 22 were charged, to the potential induced in secondary winding 17, through forward-biased diode 19 and resistor 18. Once the potential induced in winding 17 begins to decrease due to the change in the degree of saturation and the decreased current flow through the collector-emitter path of transistor 2 and winding 4, diode 19 will no longer be forward biased and, since diode 21 is nonconductive, the load 23 will be electrically isolated from the secondary winding 17. Although the flux in the power and feedback transformers of the inverter circuits of the prior art would ordinarily tend to collapse and induce spiking and ringing potentials at this point, the extension of the saturated state of transistor 2 by the base-emitter drive supplied by capacitor 15 keeps the potential of the intput source 1 appearing across the upper portion of primary winding 4 to prevent the complete collapse of the flux stored in transformer 5. Instead, the flux or energy stored in the transformers collapses or dissipates slowly at a rate proportional to the reduction in the collector-emitter current flow through transistor 2. Since both the magnitude and existence of the spiking and ringing potentials induced in the output circuit of the inverter depend on the rate of change of flux or current with respect to time ($d\varphi/dt$ or $di/dt$), it is readily seen that the extension of the saturated interval, and the accompanying slower change of the voltages and currents in the circuit during this time extension, substantially reduces the spiking and ringing potentials in the inverter.

As discussed heretofore, transistor 2 remains in the saturated state until capacitor 15 has discharged the stored energy to the point where it can no longer supply sufficient base drive to maintain the saturated condition of transistor 2. At this point, a preferred fast switching transistor will pass through the active region rapidly to minimize power losses. When the transistor 2 comes out of saturation, the collector-emitter current flow will begin to change rapidly and the full potential of the input source 1 will be removed from the upper portion of primary winding 4. The flux or energy stored in transformer 5, however, has been considerably reduced or dissipated during the extended saturation interval of the transistor 2 and no substantial spiking or ringing voltages have been found to be present during the transition through the active region. Moreover, the remaining energy stored in capacitor 15 somewhat limits the rate with which preferred fast acting transistor 2 passes through the active region and the switching speed of the transistor is not, therefore, merely a function of the transistor characteristics. The limited control exerted by the capacitor during this interval has been experimentally found to eliminate the greater portion of the switching noise normally appearing on the inverter output waveform during this interval.

Before discussing the operation of the circuit after the flux in transformer 5 has collapsed, it is useful to examine the interaction of the elements in the base-emitter or feedback circuits of the inverter transistors. Normally the charge on capacitor 15 will be sufficient to back-bias diode 13 and thus prevent capacitor 16 from charging to the potential appearing across secondary winding 9 of feedback transformer 7. Once transistor 2 comes out of saturation, however, the remaining flux stored in each of power and saturable transformers 5 and 7 collapses and induces potentials in their secondary windings which are opposite in polarity to the potentials previously induced. The potential now induced in winding 9 will be of a polarity such as to forward-bias diode 13, which is no longer back-biased by discharging capacitor 15, into conduction and permit capacitor 16 to charge through conducting diode 13 to the potential induced in winding 9. The small forward potential drop across diode 13 will both tend to back-bias transistor 2 to drive this transistor into cutoff and limit the inverse base-emitter voltage which may appear across transistor 2 to the forward voltage drop of the diode. This action accelerates the passage of the transistor 2 through the remaining portion of the active region and into cutoff. It should be noted that although transistor 2 is driven into cutoff, the forward voltage drop across the diode 13 prevents the transistor from going into deep cutoff. The transistor is, therefore, more easily and quickly biased into saturation on the succeeding half-cycle.

Although the potential thus induced in winding 9 is of a polarity such as to provide sufficient base-emitter drive to cause inverter transistor 3 to be driven toward saturation, only negligible collector-emitter current will flow through this transistor until sufficient potential is induced in secondary winding 17 by the collapsing flux to forward bias diode 21 into conduction, i.e., the potential induced in winding 17 must exceed the potential stored in the filter capacitors 20 and 22. During this interval there is sufficient base-emitter drive supplied by the feedback network to cause the base-emitter path of transistor 3 to be biased into saturation so that the transistor is immediately biased into saturation by the time the output diode 21 is forward biased into conduction. Since transistor 3 is thus driven into saturation before there is substantial collector-emitter current flow, there is very little power loss during this interval and the efficiency of the circuit is further increased.

The symmetrical nature of this circuit causes the cycle of operation discussed for transistor 2 to then repeat itself for transistor 3 until transistor 2 is again biased into saturation and so on. During the time that transistor 3 is saturated, capacitor 16 will store the energy that maintains the saturated condition of the transistor after the base-emitter drive supplied by feedback winding 9 of transformer 7 is removed.

It should be obvious at this point that although in a preferred embodiment of the invention transistors with a high switching speed would be used, transistors with slower switching speeds may also be employed at a small sacrifice in circuit efficiency. Even with transistors with slower switching speed characteristics, however, the inverter circuit embodying the invention would still exhibit higher efficiencies than the circuits of the prior art.

In summary, then, capacitors 15 and 16 are provided across the base and emitter electrodes of converter transistors 2 and 3, respectively, to provide sufficient bias to extend the saturated state interval of an inverter transistor after the base-emitter drive supplied by the feedback circuitry has been removed. As the capacitor exponentially discharges to provide base-emitter drive during the extension of the saturated interval, the transistor slowly comes out of deep saturation and toward the active state. As the transistor comes out of deep saturation, its collector-emitter current decreases and the diode-filter capacitor combination causes the load to be electrically isolated from the output or power transformer. The decreasing collector-emitter current over the extended interval during which the transistor remains saturated permits a significantly slower change of flux and current ($d\varphi/dt$ or $di/dt$) with respect to time than would be obtained if a high speed transistor were switched immediately from saturation to cutoff. The spiking and ringing effects of high speed switching in inverter circuits are thereby minimized. In a preferred embodiment, the inverter embodying the invention would employ transistors that have high speed switching characteristics and pass rapidly, under the control of the aforenoted base-emitter capacitors, through the power-wasting active state. The control exerted by the capacitors during this interval has been experimentally found to eliminate the greater portion of the switching noise normally appearing in the inverter output waveform during this transition. The flux stored in the saturable feedback transformer also collapses during the extended saturation interval of the inverter transistor and induces a base-emitter drive which is opposite in polarity to the previously induced drive. When the capacitor connected across the base-emitter path of the transistor passing from the saturated to the active state has discharged sufficiently, the diode across the capacitor is forward biased and permits both the capacitor across the nonconducting transistor to charge and base-emitter drive to be supplied to the nonconducting transistor. The discharging capacitor then discharges completely and accelerates the previously conducting transistor through the remainder of the active region into cutoff. After a short interval during which the collector-emitter current through both transistors is cutoff, the previously cutoff transistor is biased into saturation by the feedback circuitry. This transistor is, therefore, saturated at the start of the subsequent symmetrical half-cycle. The whole cycle then regeneratively repeats itself. Since both transistors are operated essentially only in the minimal power loss states of saturation or cutoff, the efficiency of the circuit has proved to be relatively high without the spiking and ringing effects of the inversion circuits of the prior art.

Since the circuit disclosed is made up of a pair of single-sided transistor oscillator inverters, the present invention may be practiced as a single transistor oscillator-inverter. In the circuit shown in the drawing, for example, input source 1, transistor 2, transformers 5 and 7, resistor 10, diode 13 and capacitor 15 form such an oscillator (the source 1 and transformers 5 and 7 are common to each of the oscillators).

The above-described arrangement is illustrative of the principles of the invention. Other embodiments may be devised by those skilled in the art without departing from the spirit and scope of the invention.

What is claimed is:

1. An inverter circuit comprising first and second transistors each having base, collector, and emitter electrodes, a transformer having primary and secondary windings, a source of input potential, means connecting the collector and emitter electrodes of said first and second transistors between said source of input potential and separate portions of said primary winding, feedback means including first and second diodes coupled to said primary winding and connected to the base and emitter electrodes of each of said first and second transistors to apply sufficient bias to the base and emitter electrodes of said first and second transistors to drive each of said first and second transistors alternately into saturation and cutoff, a load, means connecting said load to said secondary winding, and first and second capacitors connected respectively across the base and emitter electrodes of said first and second transistors to store energy during the alternate intervals that said feedback means biases said respective transistor into saturation and subsequently discharge the stored energy to provide base-emitter drive to extend the saturated interval of said respective transistor after the saturation drive from said feedback means is terminated, said first diode of said feedback means being connected across said first capacitor and poled to provide a charge path for said second capacitor as soon as said feedback means biases the base-emitter path of said second transistor into conduction, said second diode of said feedback means being connected across said second capacitor and poled to provide a charge path for said first capacitor as soon as said feedback means biases the base-emitter path of said first transistor into conduction, whereby the transistor being biased to cutoff is accelerated through a portion of the active state into cutoff.

2. An inverter circuit comprising first and second transistors each having base, collector, and emitter electrodes, a transformer having primary and secondary windings, a source of input potential, means connecting the emitter and collector electrodes of said first and second transistors between said source of input potential and equal portions of said primary winding, first and second diodes individually connected across the base and emitter electrodes of said first and second transistors respectively, each of said diodes being poled to conduct in a direction opposite to the conductivity direction of the base-emitter junction to which it is connected, feedback means coupled to said primary winding and connected by said second and first diodes, respectively, to the base and emitter electrodes of each of said first and second transistors to apply sufficient bias to drive each of said transistors alternately into saturation and cutoff, a load circuit including a filter capacitor and a diode serially connected with the load, means connecting said load circuit to said secondary winding, and first and second capacitors, means connecting said first capacitor across the base and emitter electrodes of said first transistor to store energy from said feedback means through said second diode when said first transistor is conductive, means connecting said second capacitor across the base and emitter electrodes of said second transistor to store energy from said feedback means through said first diode when said second transistor is conductive, said stored energy in each of said transistors subsequently providing base-emitter drive to extend the saturated interval of said respective transistors after the saturation drive from said feedback means is terminated, said ouput circuit diode being poled to electrically isolate the load from said secondary winding when the emitter-collector current in a saturated transistor begins to decrease.

3. An inverter circuit in accordance with claim 2 wherein said first and second capacitors have a capacitance proportional to the stored energy required to at least partially control the rate with which said first and second transistors pass through the active state whereby switching noise is eliminated from the voltage waveform appearing across said load.

4. An inverter circuit in accordance with claim 3 wherein said first and second transistors have high switching speeds between the saturated and cutoff states of the said transistors.

References Cited

UNITED STATES PATENTS 2,976,461  3/1961  Dilger et al. _____ 331—113
3,192,464  6/1965  Johnson et al. _____ 331—113

ROY LAKE, *Primary Examiner.*

S. H. GRIMM, *Assistant Examiner.*